United States Patent
Finn et al.

(10) Patent No.: US 8,639,589 B2
(45) Date of Patent: *Jan. 28, 2014

(54) EXTERNALIZING VIRTUAL OBJECT TAGS RELATING TO VIRTUAL OBJECTS

(71) Applicant: International Business Machines Corporation, Armonk, NY (US)

(72) Inventors: Peter G. Finn, Markham (CA); Rick A. Hamilton, II, Charlottesville, VA (US); Neil A. Katz, Parkland, FL (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/913,788

(22) Filed: Jun. 10, 2013

(65) Prior Publication Data

US 2013/0275271 A1 Oct. 17, 2013

Related U.S. Application Data

(63) Continuation of application No. 12/198,149, filed on Aug. 26, 2008, now Pat. No. 8,473,356.

(51) Int. Cl.
*G06Q 30/00* (2012.01)
(52) U.S. Cl.
USPC ............... 705/26.62; 705/26.1; 705/26.61
(58) Field of Classification Search
USPC ............................... 705/26.1, 26.62
See application file for complete search history.

(56) References Cited

U.S. PATENT DOCUMENTS

| | | | |
|---|---|---|---|
| 5,497,491 A | 3/1996 | Mitchell et al. | |
| 6,690,402 B1 | 2/2004 | Waller et al. | |
| 7,028,119 B2 | 4/2006 | Hue | |
| 8,052,520 B2 * | 11/2011 | Park | 463/25 |
| 2003/0139968 A1 | 7/2003 | Ebert | |
| 2003/0204447 A1 | 10/2003 | Dalzell et al. | |
| 2005/0010475 A1 | 1/2005 | Perkowski et al. | |
| 2005/0218218 A1 | 10/2005 | Koster | |
| 2006/0075055 A1 | 4/2006 | Littlefield | |
| 2006/0101067 A1 | 5/2006 | Kilian-Kehr et al. | |

(Continued)

FOREIGN PATENT DOCUMENTS

EP   1085432 A2   3/2001

OTHER PUBLICATIONS

"A virtual interactive teaching environment using XML and augmented reality." International Journal of Electrical Engineering Education. Oct. 2001. [recovered from ProQuest on Aug. 28, 2013].*

(Continued)

*Primary Examiner* — Matthew Zimmerman
*Assistant Examiner* — Kathleen G Palavecino
(74) *Attorney, Agent, or Firm* — William E. Schiesser; Keohane & D'Alessandro, PLLC

(57) ABSTRACT

A system and method in a virtual universe system for tagging objects in one virtual world so that avatars in other virtual worlds can search for, review, purchase, and exchange real goods and virtual objects. In a virtual universe having more than one virtual world, an object in one virtual world may be tagged with a seller identification, an advertising location, an item type, and details of the item. The object may then be externalized to other virtual worlds within the virtual universe for searching.

20 Claims, 7 Drawing Sheets

(56) References Cited

U.S. PATENT DOCUMENTS

| | | |
|---|---|---|
| 2006/0101332 A1 | 5/2006 | Imielinski et al. |
| 2007/0241196 A1 | 10/2007 | Yoon et al. |
| 2008/0046956 A1 | 2/2008 | Kulas |
| 2008/0091548 A1 | 4/2008 | Kotas et al. |
| 2008/0091549 A1 | 4/2008 | Chang et al. |
| 2008/0100443 A1 | 5/2008 | Grunwald et al. |
| 2008/0120558 A1 | 5/2008 | Nathan et al. |
| 2008/0133486 A1 | 6/2008 | Fitzgerald et al. |
| 2008/0143481 A1 | 6/2008 | Abraham et al. |
| 2008/0243644 A1 | 10/2008 | Bezos et al. |
| 2008/0255957 A1* | 10/2008 | Erdem et al. ............... 705/26 |
| 2008/0270579 A1 | 10/2008 | Herz et al. |
| 2009/0012878 A1 | 1/2009 | Tedesco et al. |
| 2009/0083051 A1 | 3/2009 | Bokor et al. |
| 2009/0158161 A1 | 6/2009 | Gibbs et al. |
| 2009/0253494 A1* | 10/2009 | Fitch et al. ............... 463/25 |
| 2009/0291748 A1* | 11/2009 | Caswell et al. ............ 463/25 |
| 2009/0300493 A1 | 12/2009 | Hamilton, II et al. |
| 2009/0312080 A1 | 12/2009 | Hamilton, II et al. |
| 2010/0005007 A1 | 1/2010 | Cox et al. |
| 2010/0005141 A1 | 1/2010 | Cannon et al. |
| 2010/0030660 A1* | 2/2010 | Edwards ............... 705/27 |
| 2010/0045660 A1 | 2/2010 | Dettinger et al. |
| 2010/0050100 A1 | 2/2010 | Dettinger et al. |
| 2010/0094635 A1 | 4/2010 | Bermudez et al. |
| 2010/0203968 A1 | 8/2010 | Gill et al. |

OTHER PUBLICATIONS

"Edge Indexing in a Grid for Highly Dynamic Virtual Environments." Beomjoo Seo. May 2008. [recovered from ProQuest on Aug. 28, 2013].*

Yang, X. et al., "Hierarchical Animation Control of Avatars in 3-D Virtual Environments," IEEE Transactions on Instrumentation and Measurement, vol. 54, No. 3, Jun. 2005, pp. 1333-1341.

Kathleen G. Davison, USPTO Office Action, U.S. Appl. No. 12/198,149, Mail Date Oct. 28, 2009, 24 pages.

Kathleen G. Davison, USPTO Final Office Action, U.S. Appl. No. 12/198,149, Mail Date Apr. 6, 2010, 24 pages.

Kathleen G. Davison, USPTO Office Action, U.S. Appl. No. 12/198,149, Mail Date Jul. 14, 2010, 27 pages.

Kathleen G. Davison, USPTO Final Office Action, U.S. Appl. No. 12/198,149, Mail Date Dec. 9, 2010, 23 pages.

Kathleen G. Palavecino, USPTO Notice of Allowance and Fee(s) Due, U.S. Appl. No. 12/198,149, Date Mailed Feb. 19, 2013, 45 pages.

* cited by examiner

EXTERNALIZING VIRTUAL OBJECT TAGS RELATING TO VIRTUAL OBJECTS

CROSS-REFERENCE TO RELATED APPLICATION

This application is a continuation of, and claims the benefit of, co-pending and co-owned U.S. patent application Ser. No. 12/198,149, filed Aug. 26, 2008, the entire contents of which are herein incorporated by reference. This application is also related in some aspects to the commonly owned and co-pending U.S. patent application Ser. No. 13/913,697, filed Jun. 10, 2013.

FIELD OF THE INVENTION

Aspects of the present invention provide a system and method for tagging objects for heterogeneous searching in a virtual universe. Using an embodiment of the present invention, an avatar in one virtual world may search for and find an item in another virtual world.

BACKGROUND OF THE INVENTION

A virtual world is a computer-based simulated environment intended for its users to inhabit and interact via avatars. A computer avatar is a personalized graphic file or rendering that represents a computer user. These avatars are usually depicted as textual, two-dimensional, or three-dimensional graphical representations, although other forms are possible (auditory and touch sensations for example). Some, but not all, virtual worlds allow for multiple users. There may be multiple virtual worlds. One such virtual world is provided by Second Life. Second Life is an Internet-based virtual world launched in 2003, developed by Linden Research, Inc. (commonly referred to as Linden Lab). Second Life is a trademark of Linden Research, Inc.

Many companies are utilizing virtual worlds for business functions such as by having on-line stores available for shopping in a virtual space. These virtual stores might sell both real merchandise and virtual goods. An avatar may be used to search for and purchase the real merchandise and virtual goods in the virtual world in which it exists. In order to conduct business or search for an item in another virtual world, an avatar must login to or teleport to a specific virtual world.

SUMMARY OF THE INVENTION

In general, aspects of the present invention provide systems and methods for enabling commerce between disparate virtual worlds and other web interfaces through the use of common tags defining objects. An avatar in one virtual world can search for, review, purchase, and exchange real goods and virtual objects in another virtual world. Additionally, a web user or avatar would also have access to objects being sold by avatars and stores within virtual worlds.

One embodiment of the present invention is a method of tagging a virtual object contained in a virtual world, the method comprising: tagging the virtual object with identifying information to generate a virtual object tag; and externalizing, by a processor, the virtual object tag outside of its virtual world so that the virtual object tag is locatable by a query generated within a virtual world different than the virtual world containing the virtual object, wherein the virtual world is associated with a plurality of virtual worlds, at least one virtual world having an avatar and another having a virtual store, the method further comprising the avatar communicating with the virtual store in the another virtual world.

Another embodiment is a system comprising a central repository for receiving, storing and externalizing virtual object tags relating to virtual objects for sale, the system comprising: an externalizer configured to externalize a virtual object tag outside of its virtual world so that the virtual object tag is locatable by a query generated within a virtual world different than the virtual world containing the virtual object, wherein the virtual world is associated with a plurality of virtual worlds, at least one virtual world having an avatar and another having a virtual store, and wherein the avatar communicates with the virtual store in the another virtual world.

Another embodiment is a computer-readable storage medium storing computer instructions, which when executed, enables a computer system to externalize virtual object tags relating to virtual objects, the computer instructions comprising: externalizing a virtual object tag outside of its virtual world so that the virtual object tag is locatable by a query generated within a virtual world different than the virtual world containing the virtual object, wherein the virtual world is associated with a plurality of virtual worlds, at least one virtual world having an avatar and another having a virtual store, the computer instructions further comprising the avatar communicating with the virtual store in the another virtual world.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

Aspects of the present invention provide a solution for tagging objects in a virtual world and externalizing the tag in a virtual universe so that they can be found by an avatar for possible purchase. The system and method of the present invention provides an interface so that an object may be externalized and found outside of its virtual world. The system and method of the present invention also provides for searching for the objects and will stop searching after a maximum number of tries. Still yet, any of the components of the present invention could be deployed, managed, serviced, etc., by a service provider who offers to provide a solution for tagging or externalizing the objects in the system.

Figure 1:
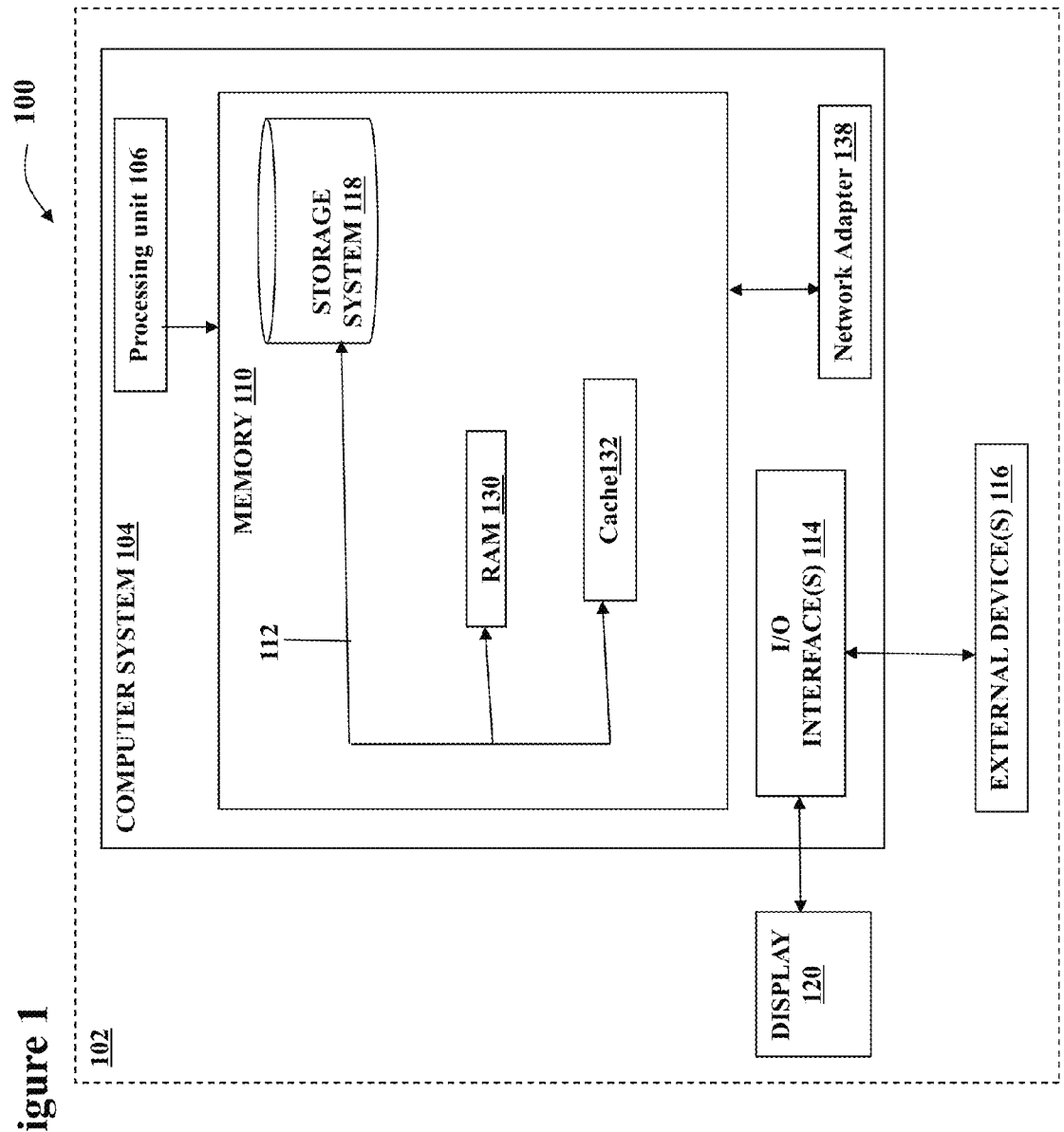
FIG. 1 shows a data processing system suitable for implementing an embodiment of the present invention.

A data processing system 100, such as system 102 shown in FIG. 1, suitable for storing and/or executing program code of the present invention will include a computer system 104 having at least one processor (processing unit 106) coupled directly or indirectly to memory elements through a system bus 112. The memory elements can include local memory (RAM 130) employed during actual execution of the program code, bulk storage (storage 118), and cache memories (cache 132) that provide temporary storage of at least some program code in order to reduce the number of times code must be retrieved from bulk storage 118 during execution. Input/output or I/O devices (external devices 116) (including but not limited to keyboards, displays (display 120), pointing devices, etc.) can be coupled to the system either directly or through intervening I/O controllers (I/O interface(s) 114).

Figure 2:
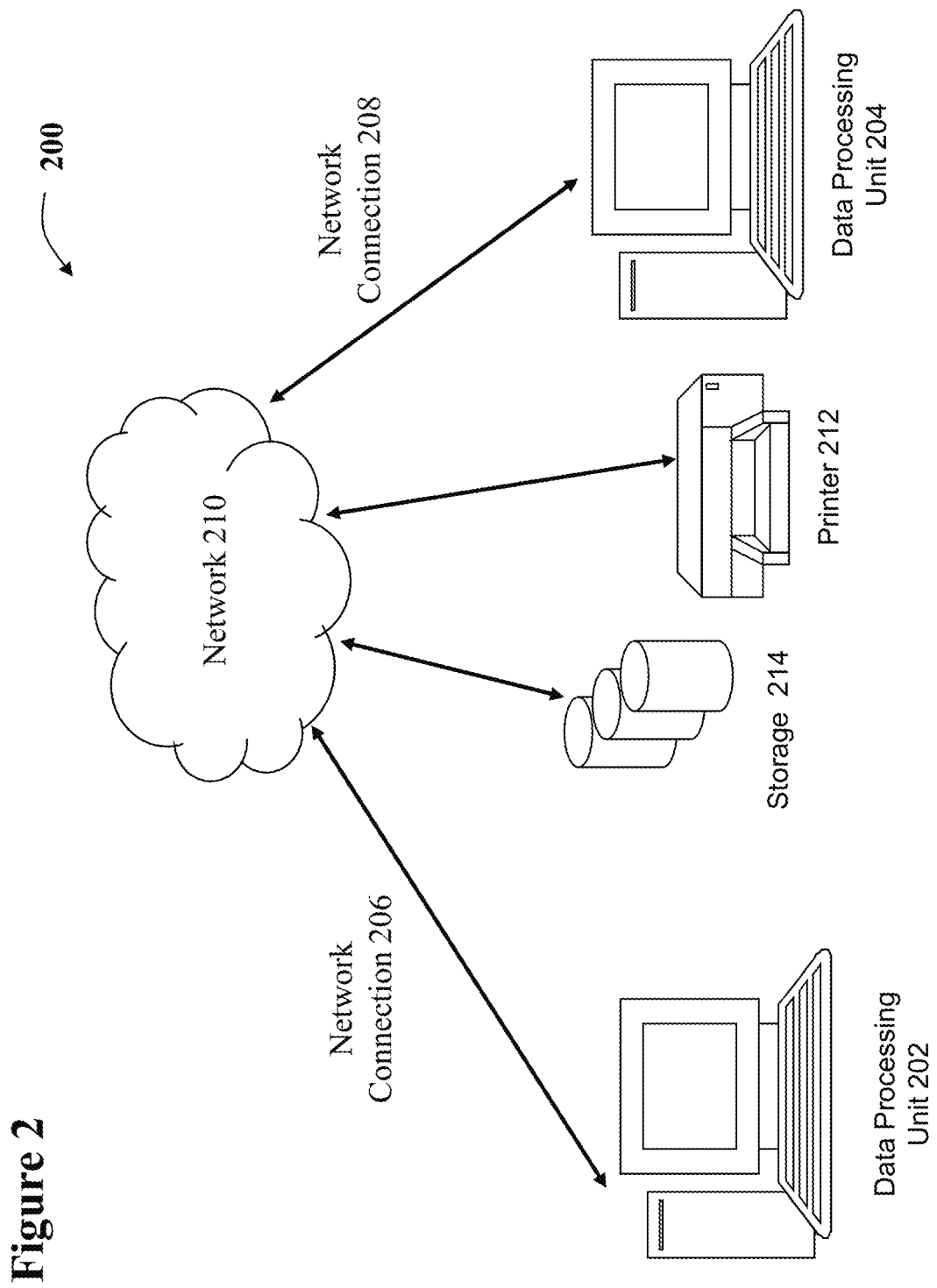
FIG. 2 shows a network for implementing an embodiment of the present invention.

Network adapters (network adapter 138) or network interface may also be coupled to the system 200 to enable the data processing system (as shown in FIG. 2, data processing unit 202) to become coupled through network connections (network connection 208) to other data processing systems (data processing unit 204), remote printers (printer 212) and/or storage devices (storage 214) through intervening private and/or public networks (network 210). (A computer network is composed of multiple computers connected together using a telecommunication system for the purpose of sharing data, resources and communication. Modems, cable modem and Ethernet cards are just a few of the currently available types of network adapters. (A network card, network adapter or NIC (network interface card) is a piece of computer hardware designed to allow computers to communicate over a computer network. It is both an OSI layer 1 (physical layer) and layer 2 (data link layer) device, as it provides physical access to a networking medium and provides a low-level addressing system through the use of MAC addresses. It allows users to connect to each other either by using cables or wirelessly.)

With the growing popularity and adoption of virtual environments both personal and business functions are becoming increasingly available. Some companies, such as International Business Machines Corporation®, have on-line stores available for shopping in a virtual space and these virtual stores might sell both real merchandise and virtual goods. With a variety of virtual worlds presently available, and the potential for many more, as this venue becomes increasingly popular, it is important that interoperability between virtual worlds exists and also to other external electronic environments such as the World Wide Web. Presently, an avatar must login to or teleport to a specific virtual world environment in order to conduct business or search for an item in such an environment. The present invention provides a system and method of tagging virtual world objects and externalizing the objects through the use of common tags, thereby enabling free search capabilities and enterprise between avatars in differing virtual world environments and users external to the virtual worlds.

Even given today's limitations and the promise of open standards, the tagging system and method of the present invention permits searches of documents and other "byte collections" that have meaning outside of virtual worlds. Using the tagging method and system of the present invention, a user can perform a search and find real or virtual items or objects in a repository in a virtual world.

The system and method of tagging of the present invention can likewise be applied to real world goods and services. For instance, if a user desires to sit inside a virtual automobile to see how it feels, prior to visiting real world dealerships, the system and method permits the user to search virtual worlds to see where such a virtual car could be experienced. Similarly, a user could use a legacy web browser and search for the virtual hotel and would receive results that would allow him or her to walk through the virtual hotel in any of several environments, and then book a stay accordingly.

The system and method of the present invention may be used for virtual products between virtual worlds and may increase as open standards are adopted. Its use with real-world products, documents, or services may be immediate and of high value. The present invention comprises a system and method of tagging virtual world objects, externalizing the tags virtual world objects so that they can be found and searching for the externalized virtual world objects.

Residents may be represented in the environment by an avatar. The basic avatar is humanoid in shape that may be customized in a variety of ways:

- a series of GUI controls, modifying every aspect of the basic mesh (body shape, skin, hair style etc.);
- creating clothing or buying clothes made by other residents;
- attachments—3D objects intended to supplement or replace body structure, clothes or hair;
- animation overriders (intended to supplement or replace the stock set of animations) using, for instance, a scripting language to trigger animations stored in an animation file format; and/or
- sonic overriders—using a scripting language to trigger sounds such as footsteps, or emotive cues such as laughing and crying.

Any of these could be considered to be a virtual good, object or item.

The result can either be faithful to the original humanoid avatar, or can result in a completely non-humanoid representation of the character. These customizations can be packaged up into a single outfit, with common applications of outfits.

The VU environment provides an opportunity for commercial vendors to market their wares and conduct other commerce with others who are resident in the VU via avatars.

Figure 3:
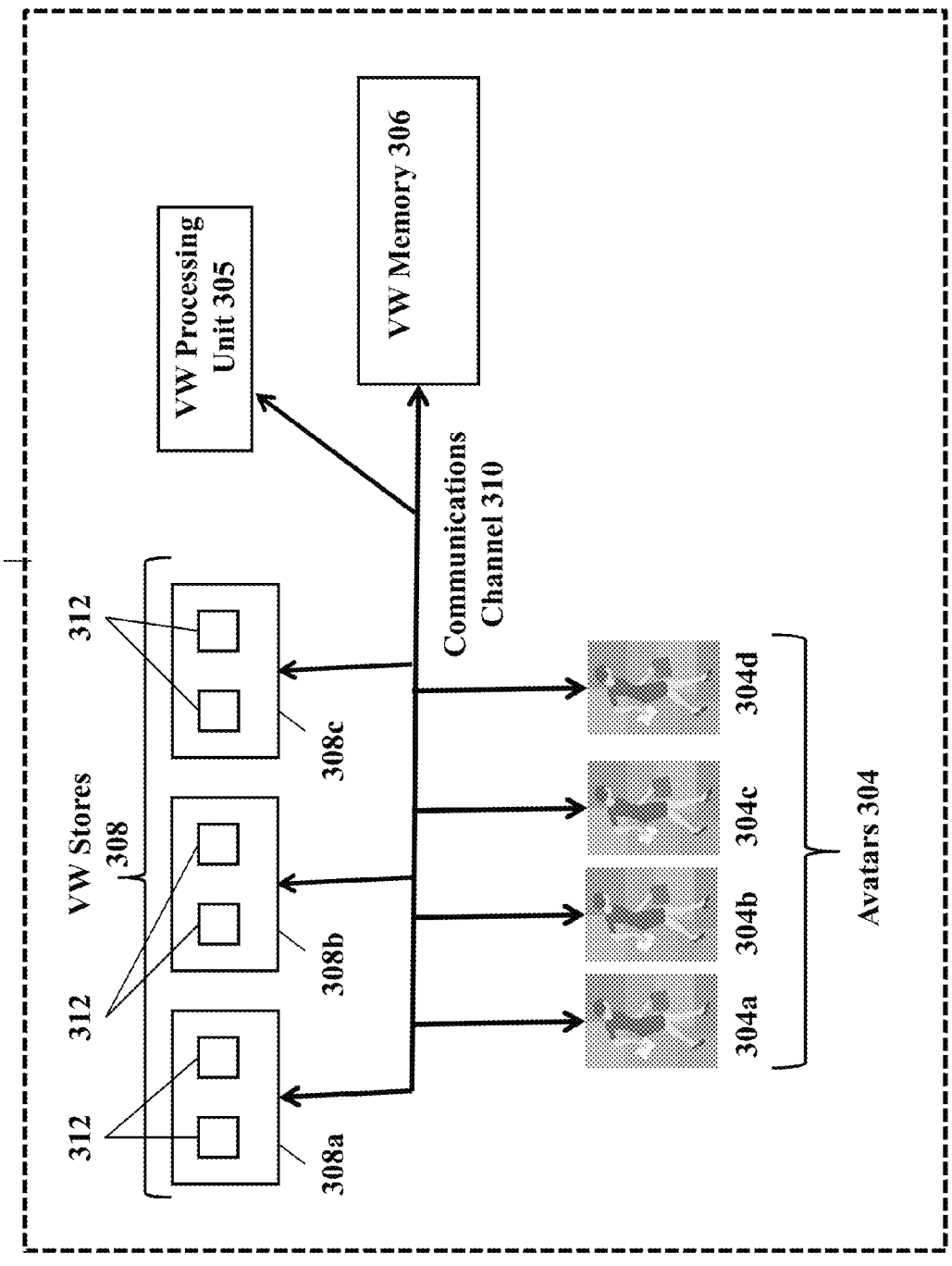
FIG. 3 illustrates an embodiment of the system of the present invention.

An avatar system 300 for implementing the present invention is shown in FIG. 3 having a virtual world (VW 301) that may have a VW processing Unit 305, a VW memory 306 for storing information about the VW 301 and activities and avatars within the VW 301, and one or more avatars 304 (304a, 304b, 304c, 304d). There can be any number of avatars 304. The avatars 304 can communicate with one another, amongst themselves, and with VW stores 308, VW processing unit 305 or VW memory 306 or other assets (such as avatar attachments, vehicles, buildings, furniture, sculpture or other items) in the VW 301 via communications channel 310. The avatars 304 are considered to be VU residents.

VW 301 further may have VW stores 308. Each VW store 308a, 308b, 308c may have objects 312 for sale to avatars 304. The objects 312 may be real or virtual. A real object may be a car or a motorcycle for example. A virtual object may be anything from clothing for the avatar or a dental chart. The system allows an avatar to purchase a real or a virtual good.

Figure 4:
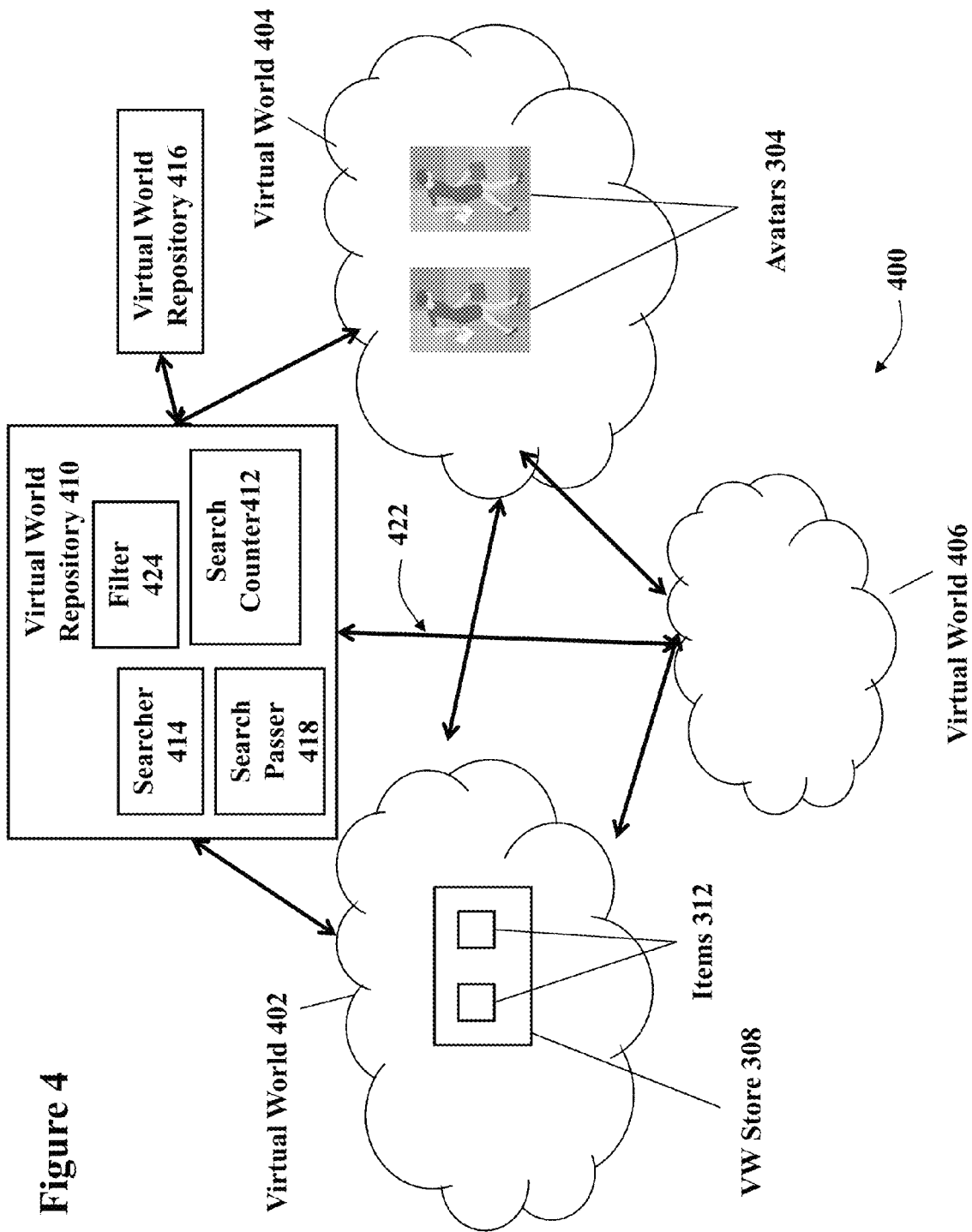
FIG. 4 illustrates a virtual universe having multiple virtual worlds according to an embodiment of the network of the present invention.

FIG. 4 illustrates a virtual universe 400 that may have one or more virtual worlds 402, 404, 406. The virtual worlds 402, 404, 406 communicate with one another via communications channels 422. The virtual universe 400 may have a virtual repository 410. The virtual world repository 410 may have a search filter 414, and search counter 412 and a search passer 418. This system may allow an avatar 304 in one virtual world 404 to search for and purchase, if desired, an item 312 in a virtual store 308 in another virtual world 402.

The search filter 414 receives a search string for an object or item 312 from an avatar 304 and searches virtual worlds 402, 406 other than virtual world 404 of the item. If search filter 414 cannot find the item, it passes the search string to another virtual repository 416 for further searching. A search counter 412 counts the number of searches so that the number of searches is limited. Once the maximum number of searches is reached, the search is completed. A search filter 424 filters the search strings from the avatars.

Figure 5:
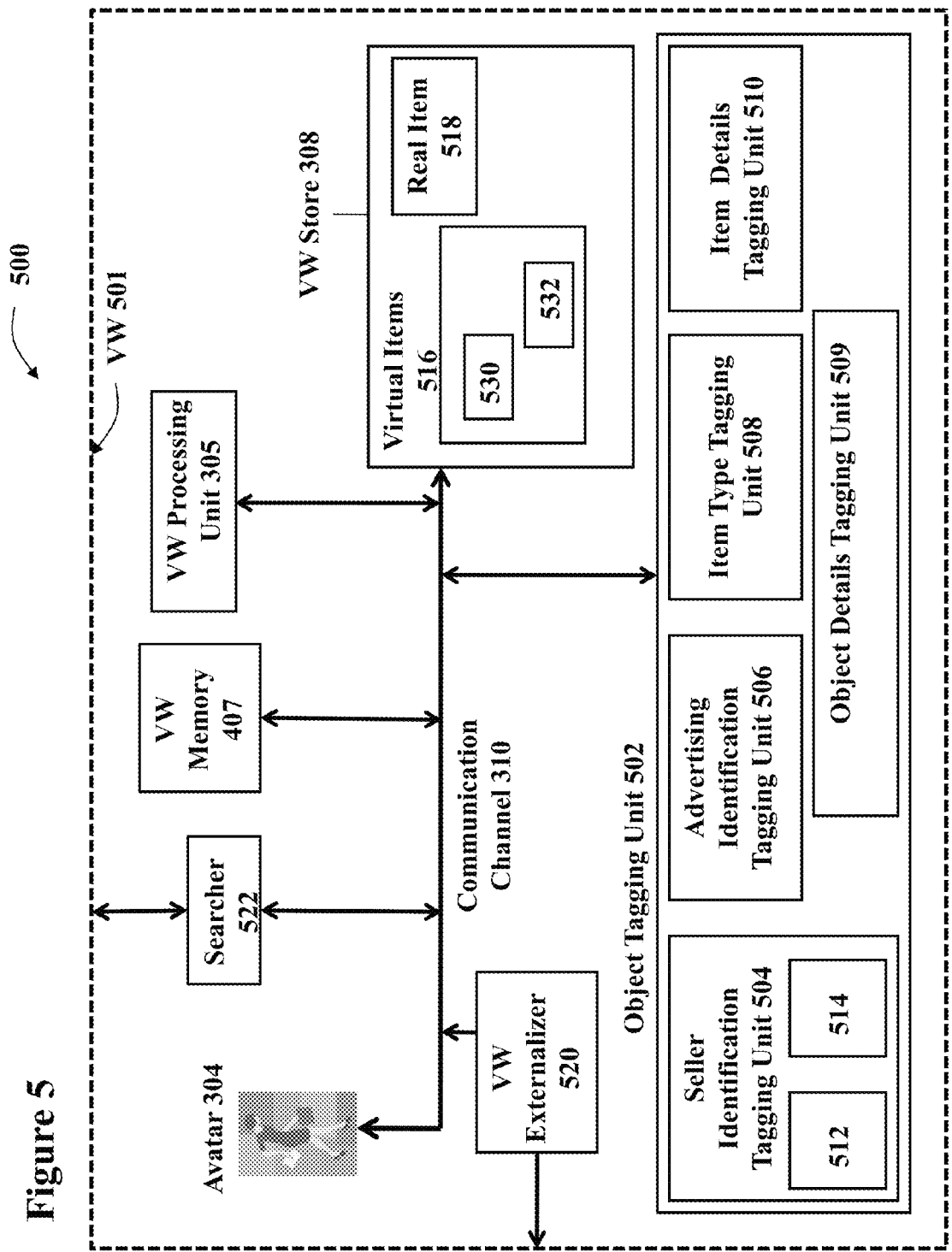
FIG. 5 illustrates a virtual world according to an embodiment of the present invention.

FIG. 5 illustrates a system 500 having a virtual world VW 501 that communicates with other virtual worlds. It may have a virtual world VW processing unit 305 and a virtual world VW memory unit 407 that provide storage and processing for virtual world VW 501. A virtual world VW store 308 may house real items or objects 516 and virtual objects 518. The virtual objects 518 may be a passive virtual object 530 or an active virtual object 532. A passive virtual object is a visual representation of a physical object such as a piece of art, where an active virtual object is functional code that performs an action such as an MPEG-1 Audio Layer 3 (MP3) music player, the code to make an Avatar perform a specific gesture, the code to make a piece of virtual jewelry sparkle, and other such code. (MPEG-1 was an early standard for lossy compression of video and audio.) An avatar 304 may communicate within the system 500 using communication channel 310 to search for or purchase an object 516, 518. An object tagging unit 502 allows an avatar to tag an item to be placed for sale in a virtual store 308. The object tagging unit 502 may have a seller identification tagging unit 504 that may have a company identification tagging unit 512 and an individual identification tagging unit 514. The object tagging unit 502 may have an advertising identification tagging unit 506 and an item type tagging unit 508. The object tagging unit 502 may have an item details tagging unit 510 for tagging the item and an object details tagging unit 509 for tagging an object with the details of the item or object. An externalizer (VW externalizer 520) externalizes the item or object tags so that they may be viewed by avatars that may reside in other virtual worlds. A searcher 522 allows an avatar 304 to search outside of the virtual world 501.

Figure 6:
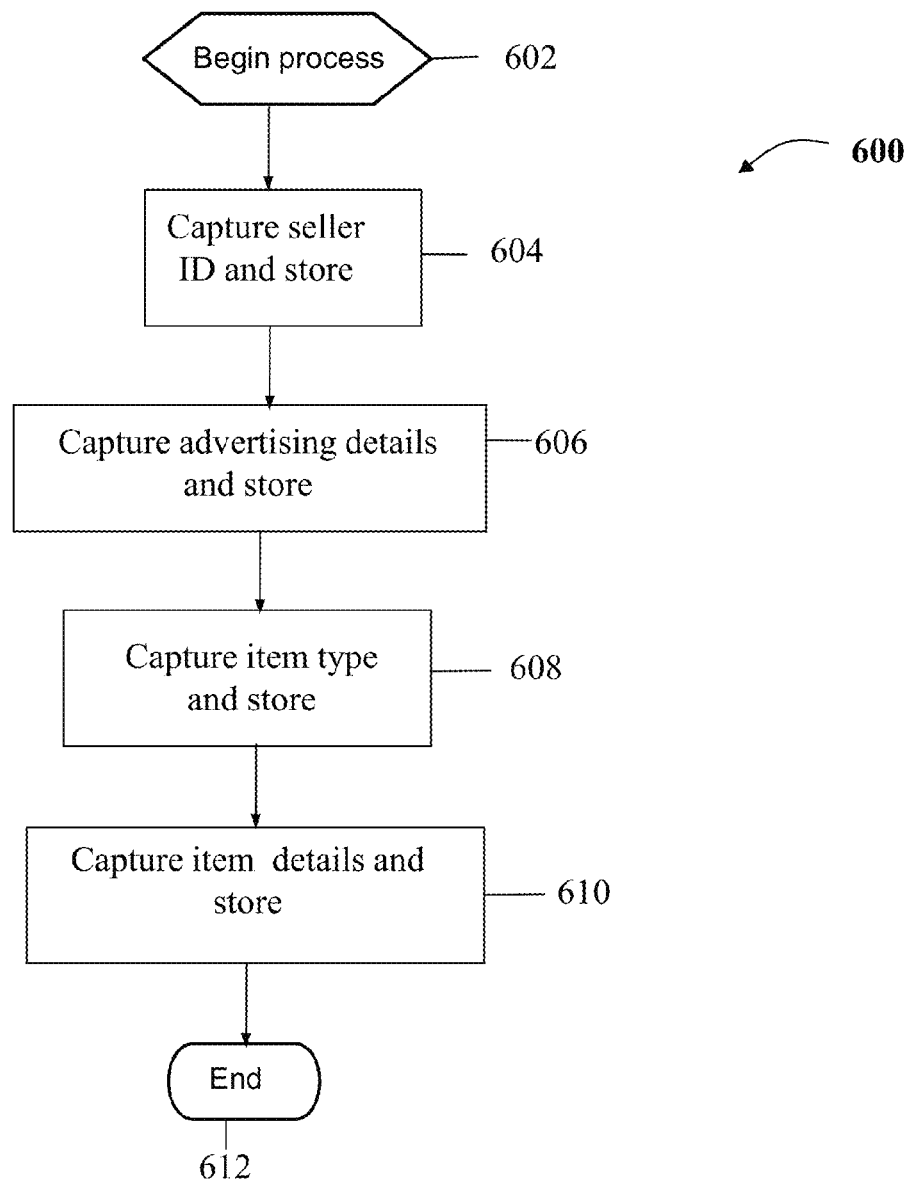
FIG. 6 is an illustrative embodiment of the method of the present invention for tagging an item.

FIG. 6 illustrates a process 600 for tagging an object or item. At 602, the process begins and at 604, the seller's identification and store is captured and coded in the tag. At 606, the advertising details (or advertising type) is captured and coded in the tag and, at 608, the item type or classification is captured and coded in the tag. At 610, the item details are captured and coded in the tag and the process ends at 612.

Figure 7:
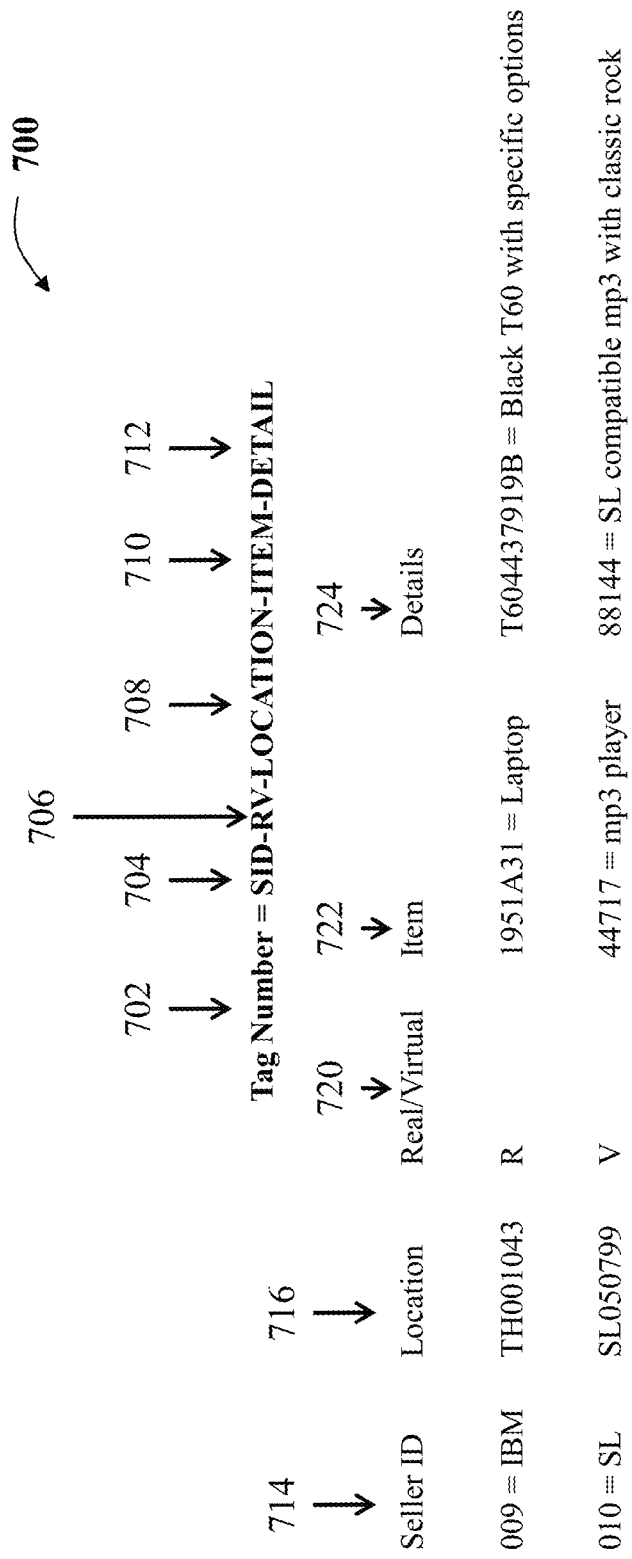
FIG. 7 is an illustrative embodiment of the application program interface of the tagging method of the present invention.

FIG. 7 illustrates an object or item tagging format 700 that may be externalized outside of a virtual world. It may have a tag number 702 that identifies the item or object. It may have an identification number such as SID 704 and a real/virtual indicator (RV 706). The location may be specified by LOCATION field 708. The item or object may be identified in an ITEM field 710 and the item details may be itemized in DETAIL 712. The table more clearly shows the breakout. At 714, the seller identification is shown. In the first row, 009=IBM is the seller and in the second row 010=SL (Second Life) is the seller. (IBM is a registered trademark of International Business Machines Corporation. Second Life is a trademark of Linden Research, Inc.) The location of the item or object is specified in column 716. The item is identified as being real or virtual in column 720. The item is identified in column 722 such as a laptop or an MP3 player as examples. Further details relating to the item or object are specified in column 724.

It should be understood that the present invention is typically computer-implemented via hardware and/or software. As such, and client systems and/or servers will include computerized components as known in the art. Such components typically include (among others), a processing unit, a memory, a bus, input/output (I/O) interfaces, external devices, etc.

While shown and described herein as a system and method for tagging an item in a virtual universe through multimedia analysis, it is understood that the invention further provides various alternative embodiments. For example, in one embodiment, the invention provides a computer-readable/useable medium that includes computer program code to provide a solution for tagging an object so that it can be found in a search. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a computer-implemented method for tagging an object in a virtual universe and externalizing the tag so that it can be found. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

In another embodiment, the invention provides a business method that performs the process steps of the invention on a subscription, advertising, and/or fee basis. That is, a service provider, such as a solution integrator, could offer to provide a solution for tagging and externalizing the tag for a real or virtual objects in a virtual world. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method of tagging a virtual object contained in a virtual world, the method comprising:
    tagging the virtual object with identifying information to generate a virtual object tag; and
    externalizing, by a processor, the virtual object tag outside of its virtual world so that the virtual object tag is locatable by a query generated by an avatar within a virtual world different than the virtual world containing the virtual object,
    wherein the virtual world is associated with a plurality of virtual worlds, at least one virtual world having an avatar and another having a virtual store, the method further comprising the avatar communicating with the virtual store in the another virtual world.

2. The method as defined in claim 1, further comprising:
    tagging the virtual object with the seller identification;
    tagging the virtual object with the advertising location;
    tagging the virtual object with the item type; and
    tagging the virtual object with the item details.

3. The method as defined in claim 1 further comprising externalizing, by the processor, the virtual object tag outside of its virtual world so that the virtual object tag is locatable by a query generated via an external electronic environment by users external to the virtual world.

4. The method as defined in claim 1 further comprising tagging the virtual object as being associated with a real item.

5. The method as defined in claim 1 further comprising tagging the virtual object as being associated with a virtual item.

6. The method as defined in claim 1 further comprising tagging the virtual object as being associated with a company identification tag.

7. The method as defined in claim 1 further comprising tagging the virtual object as being associated with an individual identification tag.

8. The method as defined in claim 1 further comprising tagging the virtual object as being associated with at least one of a seller's rating, a rank order for display of the items, and a cost of the item in the virtual object tag.

9. A system comprising a central repository for receiving, storing and externalizing virtual object tags relating to virtual objects for sale, the system comprising:
    a processing unit and memory for communicating with an externalizer via a communication channel;
    the externalizer configured to externalize a virtual object tag outside of its virtual world so that the virtual object tag is locatable by a query generated by an avatar within a virtual world different than the virtual world containing the virtual object,
    wherein the virtual world is associated with a plurality of virtual worlds, at least one virtual world having an avatar and another having a virtual store, and wherein the avatar communicates with the virtual store in the another virtual world.

10. The system as defined in claim 9 further comprising a searcher for receiving a search request from an avatar for an object and for searching a virtual universe for the object.

11. The system as defined in claim 9 wherein the externalizer is further configured to externalize the virtual object tag outside of its virtual world so that the virtual object tag is locatable by a query generated via an external electronic environment by users external to the virtual world.

12. The system as defined in claim 10 wherein a first repository comprises a search counter for counting the number of searches and for stopping the search request when a maximum number of searches is reached.

13. The system as defined in claim 12 wherein a search string further has a search filter, the system further comprising a filtering unit for filtering the search based upon a real/virtual relational database field in the virtual object tag.

14. A non-transitory computer-readable storage medium storing computer instructions, which when executed, enables a computer system to externalize virtual object tags relating to virtual objects, the computer instructions comprising:
    externalizing a virtual object tag outside of its virtual world so that the virtual object tag is locatable by a query generated by an avatar within a virtual world different than the virtual world containing the virtual object,
    wherein the virtual world is associated with a plurality of virtual worlds, at least one virtual world having an avatar and another having a virtual store, the computer instructions further comprising the avatar communicating with the virtual store in the another virtual world.

15. The non-transitory computer-readable storage medium according to claim 14, the computer instructions further comprising: tagging the virtual object with the seller identification; tagging the virtual object with the advertising location; tagging the virtual object with the item type; and tagging the virtual object with the item details.

16. The non-transitory computer-readable storage medium according to claim 14 further comprising computer instructions for externalizing the virtual object tag outside of its virtual world so that the virtual object tag is locatable by a query generated via an external electronic environment by users external to the virtual world.

17. The non-transitory computer-readable storage medium according to claim 14 further comprising computer instructions for tagging the virtual object as being associated with a real item.

18. The non-transitory computer-readable storage medium according to claim 14, further comprising computer instructions for tagging the virtual object as being associated with a virtual item.

19. The non-transitory computer-readable storage medium according to claim 14, further comprising computer instructions for tagging the virtual object a company identification tag.

20. The non-transitory computer-readable storage medium according to claim 14, further comprising computer instructions for tagging the virtual object with an individual identification tag.

* * * * *